FIP8106 OR 3,297,875

Jan. 10, 1967 R. L. GARWIN ET AL 3,297,875

OPTICAL TRAVELING WAVE PARAMETRIC DEVICES

Filed June 28, 1962 3 Sheets-Sheet 1

INVENTORS
RICHARD L. GARWIN
WILTON A. HARDY
ROLF W. LANDAUER

BY Stephen J. Limanek
ATTORNEY

OPTICAL TRAVELING WAVE PARAMETRIC DEVICES

Filed June 28, 1962

United States Patent Office 3,297,875

Patented Jan. 10, 1967

3,297,875
OPTICAL TRAVELING WAVE PARAMETRIC DEVICES

Richard L. Garwin, Scarsdale, Wilton A. Hardy, Ossining, and Rolf W. Landauer, Briarcliff Manor, N.Y., assignors to International Business Machines Corporation, New York, N.Y., a corporation of New York Filed June 28, 1962, Ser. No. 205,951
11 Claims. (Cl. 250—199)

Figure 1:
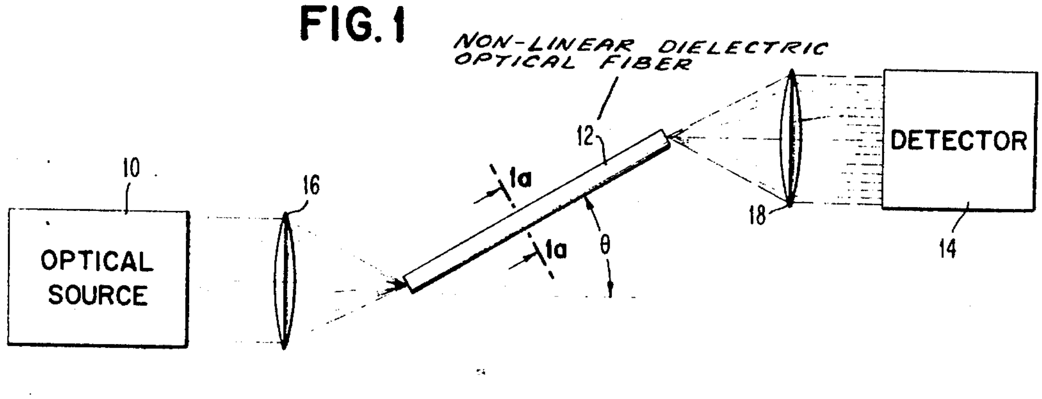

This invention relates to parametric devices and more particularly to traveling wave parametric devices operable at optical frequencies.

Parametric devices operable at microwave frequencies have been known for several years. These parametric microwave devices which have been used principally as amplifiers or oscillators include reactance elements. When the devices are of a traveling wave type, the reactance elements are disposed along a transmission line in lumped or distributed form and their parameters are periodically or continuously varied in value to provide amplification by well known non-linear interactions between a plurality of waves passing through one or more transmission lines. The reactance elements used have been either in the form of capacitors or inductors which are variable in capacitance or inductance value, respectively, in accordance with the voltage applied to or current passing through them, or in the form of non-linear media as dense electron beams. Devices of this type have been discussed in articles such as "A Traveling Wave Ferromagnetic Amplifier" by Tien and Suhl in Proceedings of the IRE, April 1958, pages 700–706; "Nonlinear Capacitance Amplifiers" by L. S. Nergaard in RCA Review, March 1959, pages 3–17; "Parametric Amplification Along Nonlinear Transmission Lines" by Rolf Landauer in Journal of Applied Physics, vol. 31, No. 3, pages 479–484, March 1960; "Parametric Standing Wave Amplifiers" by Rolf Landauer in Proceedings of the IRE, vol. 48, No. 7, July 1960; "Shock Waves in Nonlinear Transmission Lines and Their Effect on Parametric Amplification" by Rolf Landauer in IBM Journal of Research and Development, vol. 4, No. 4, October 1960; "The Variable-Capacitance Parametric Amplifier" by E. D. Reed in IRE Transactions on Electron Devices, vol. ED–6, April 1959, No. 2, pages 216–224 and U.S. Patent No. 2,815,488 granted to J. VonNeumann December 3, 1957.

In general, in the parametric devices known in the microwave art there is an inter-relationship among three waves such that the frequency of one of these three waves is equal to the sum or difference of the other two waves.

For example, the energy applied to a reactance element of a parametric amplifier for varying the reactance value thereof is commonly referred to as the pump energy and has a frequency generally substantially greater than the frequency of the signal which is to be amplified therein. The frequency of the pumping energy in the parametric amplifier is equal to the sum of the frequencies of the signal and of an idler wave, which is produced in the amplifier due to the interaction between the pump and signal voltages. When the signal and idler frequencies are of the same value this amplifier is generally referred to as a degenerative parametric amplifier. In order to provide an effective conversion of energy from the pumping wave to the signal wave in a traveling wave parametric amplifier, the velocity of propagation of the pumping and signal waves along the transmission path of this amplifier must be substantially equal. Undesired combinations of the pump and signal waves are suppressed by designing the transmission path so that velocity of propagation of the undesired frequencies is substantially different from the velocity of propagation of the pump frequency.

In addition to the traveling wave transmission line structure described hereinabove for producing coupled modes in a system, coupled modes may be produced in suitable cavities which are tuned to desired modes.

It is also known, for example, as described in Physical Review Letters, vol. 7, No. 4, August 15, 1961, pages 118 and 119 in an article entitled "Generation of Optical Harmonics," that an intense coherent optical beam when focused onto a dielectric medium produces optical harmonics due to inherent non-linearities therein. The material used for the production of optical harmonics must have a non-linear polarization characteristic and must be transparent to both the fundamental optical frequency and the desired harmonic frequency.

It is an object of this invention to provide novel parametric devices operable at optical frequencies.

It is another object of this invention to provide an amplifier capable of amplifying waves having optical frequencies, i.e., frequencies in the infrared, visible and ultraviolet regions of the electromagnetic wave spectrum.

It is still another object of this invention to provide a traveling wave parametric amplifier operable at optical frequencies.

It is yet another object of this invention to provide an improved generator producing an output at optical frequencies.

A further object of this invention is to provide an improved generator for producing an output at microwave frequencies.

Still a further object of this invention is to provide a system for converting optical energy of a given frequency into optical energy of a different frequency.

Yet a further object of this invention is to provide an optical system for mixing two waves to produce a third wave having a frequency equal to the sum or difference of the two waves.

An additional object of this invention is to provide a light modulation device.

Also an additional object of this invention is to provide a detector or demodulator responsive to optical frequencies.

In accordance with the present invention a traveling wave parametric device operable at optical frequencies is provided by applying to a non-linearly polarizable medium one or more optical waves, the medium being capable of supporting a plurality of optical waves which are frequency related to the applied wave or waves and for which the wave velocities are matched to the supporting medium, this latter condition expressing the requirement that this plurality of waves interferes constructively from point to point as they commonly propagate through the supporting medium.

An important advantage of the parametric device of the present invention is that it provides optical means for maximizing the conversion of energy from one wave of a given frequency to another wave having a frequency different from the given frequency.

An important feature of this invention is that only a simple passive element is required to produce the optical energy conversion.

The foregoing and other objects, features and advantages of the invention will be apparent from the following more particular description of preferred embodiments of the invention, as illustrated in the accompanying drawings.

Figure 1A:
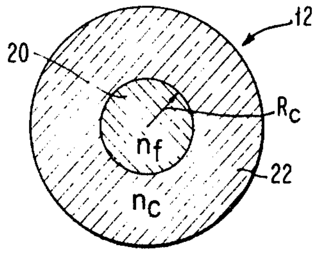
Figure 2:
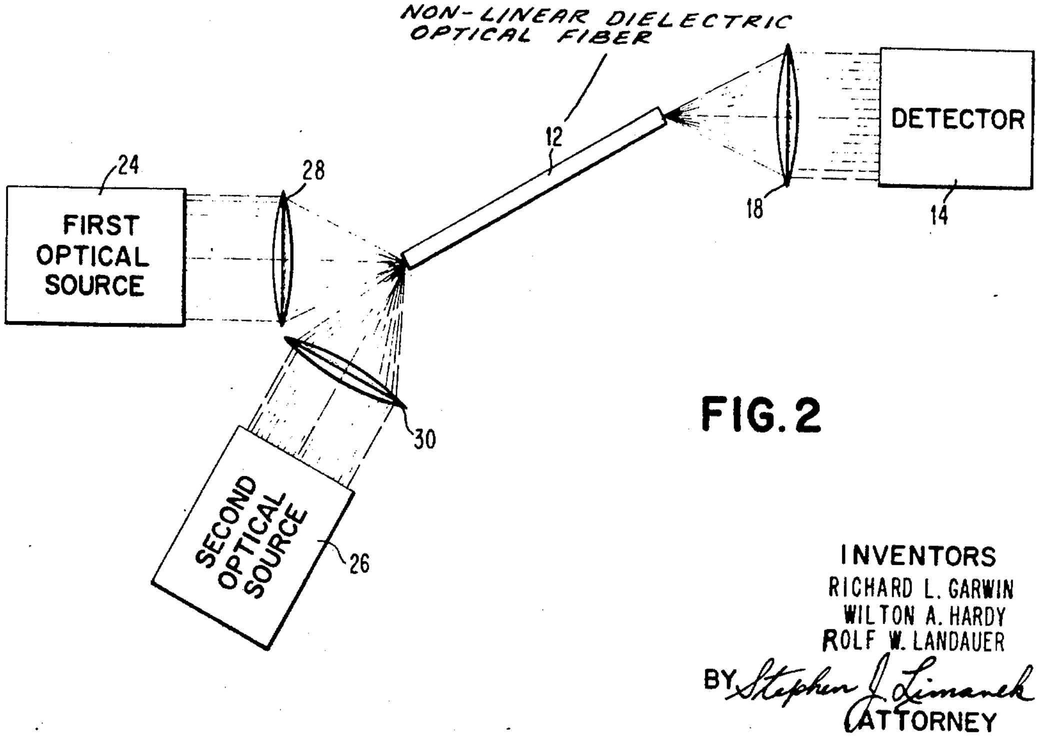
Figure 3:
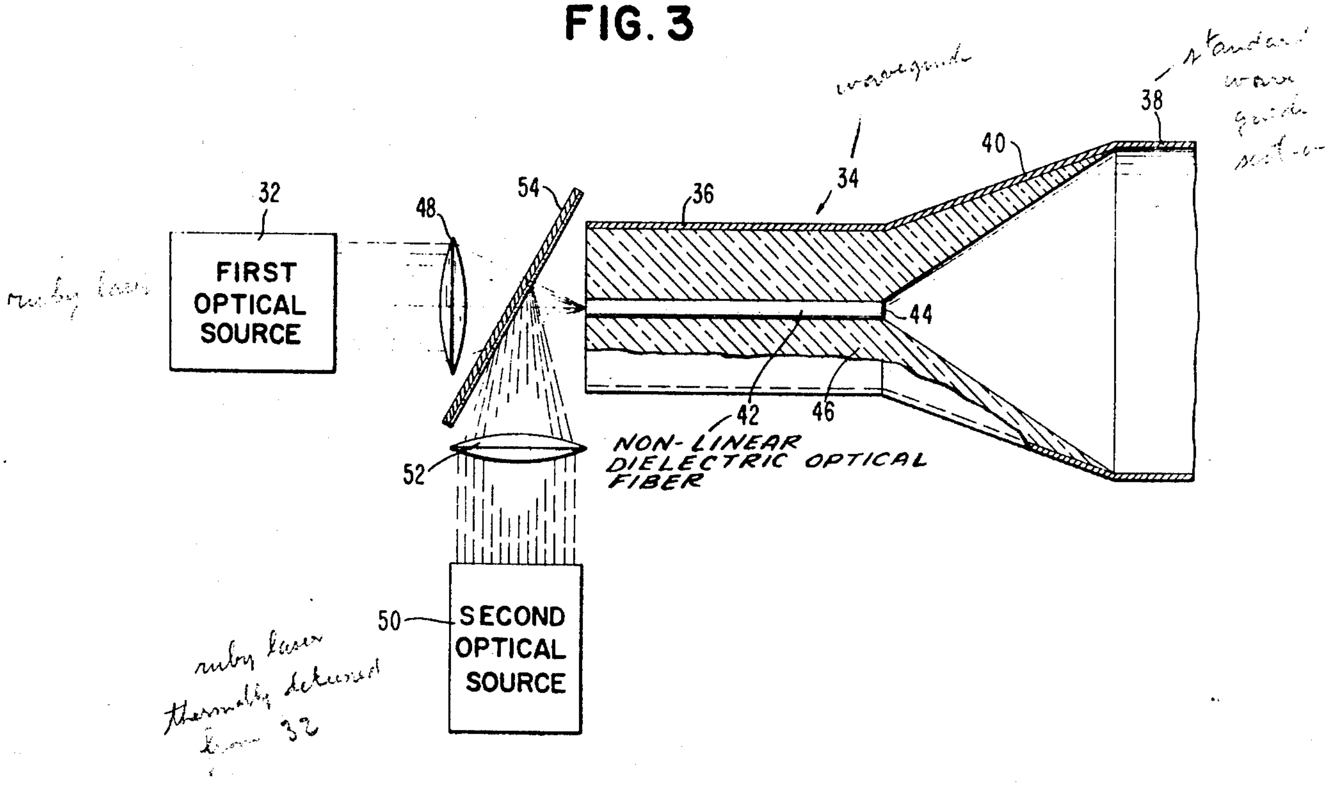
Figure 4:
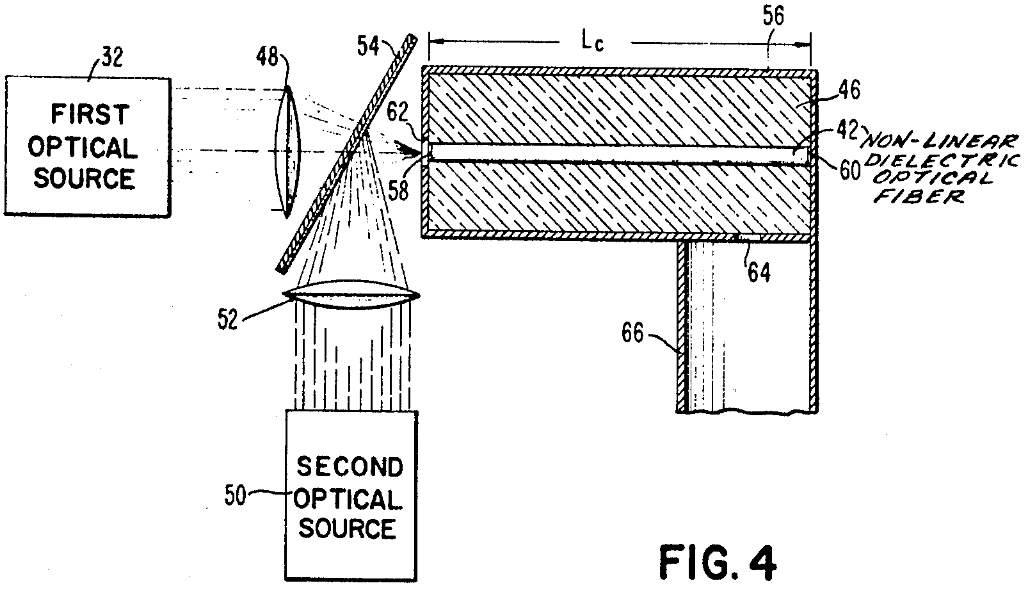
Figure 5:
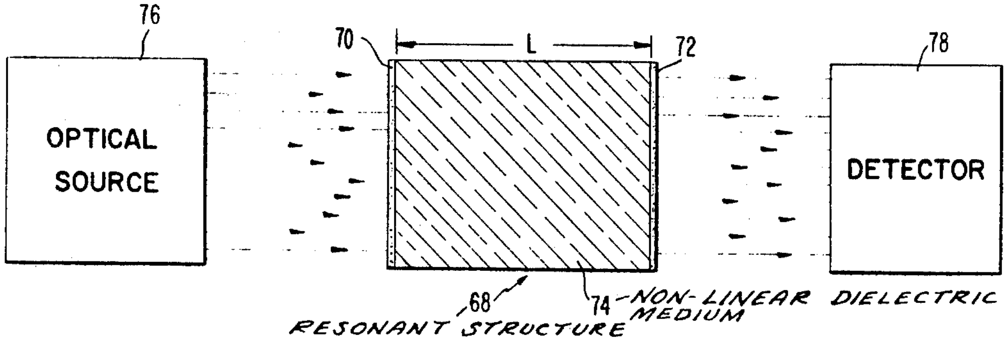
Figure 6:
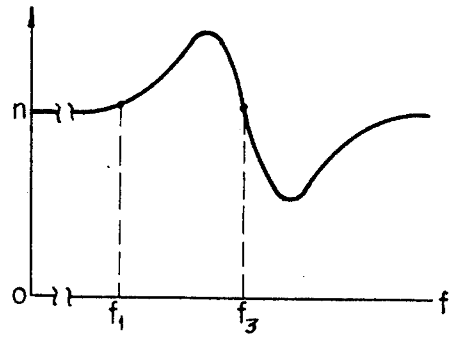
Figure 7A:
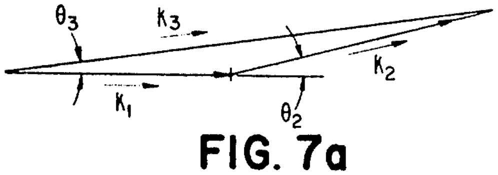
Figure 7:
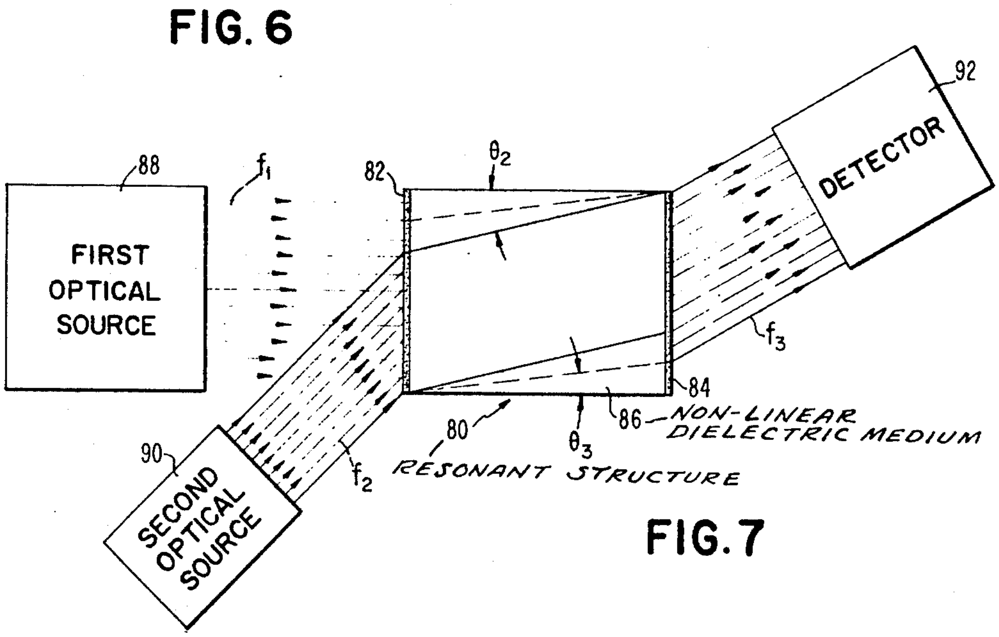

In the drawings:

FIG. 1 shows a system of the present invention for producing a harmonic of a fundamental optical wave which uses an optical fiber, FIG. 1*a* shows a cross-sectional view taken at 1*a*—1*a* through the optical fiber of the system shown in FIG. 1, FIG. 2 illustrates an embodiment of the system of the present invention wherein two optical waves are applied to and mixed in an optical fiber thereof, FIG. 3 shows another embodiment of the system of the present invention wherein two optical waves are mixed within an optical fiber to produce microwaves, FIG. 4 is a modification of the system shown in FIG. 3 for producing microwaves from optical waves, FIG. 5 is another embodiment of the system of the present invention for producing a harmonic of a fundamental optical wave, FIG. 6 is a graph indicative of the variation of the index of refraction with frequency through a non-linear dielectric medium, FIG. 7 is a modification of the embodiment of the present invention shown in FIG. 5 wherein two optical waves are mixed to produce a third wave, and FIG. 7*a* is a vector diagram indicating a balanced momentum condition in the embodiment illustrated in FIG. 7 of the drawing.

Referring to FIG. 1 in more detail, there is shown an optical system for producing a strong harmonic of a fundamental optical wave which includes an optical source 10, preferably a laser providing intense coherent radiation of a desired optical frequency $f_1$, an optical fiber or light pipe 12 made of a nonlinear dielectric medium and a suitable detector 14 responsive to optical radiation of the desired harmonic, for example, the second harmonic $f_3$ of the fundamental frequency $f_1$. A focusing lens 16 is disposed between the optical source 10 and the optical fiber 12 to focus the radiation from optical source 10 to one end of the optical fiber 12 for transmission therethrough and a collimating lens 18 is disposed between the optical fiber 12 and the detector 14 to direct the radiation emanating from the other end of the optical fiber 12 to the detector 14.

FIG. 1*a* of the drawing shows, in cross-sectional view, the optical fiber 12 of FIG. 1 to include a fiber core 20 having an index of refraction $n_f$ and a radius $R_c$ and a cladding 22 having an index of refraction $n_c$ which is somewhat less than the index of refraction $n_f$ in which the core 20 is embedded.

In the operation of the system illustrated in FIGS. 1 and 1*a* where it is desired to produce a strong second harmonic or first overtone $f_3$ of the optical fundamental wave $f_1$ generated by the optical source 10, the optical wave $f_1$ is focused onto one end of the optical fiber 12 of which at least the core 20 or cladding 22 is made of a non-linear dielectric medium and which fiber is designed to support selected propagating modes within the fiber 12 such that a momentum balance is maintained within the fiber for waves therein at the frequencies $f_1$ and $f_3$. As the wave $f_1$ travels through the fiber 12 it produces a change in the dielectric constant of the fiber 12 which travels through the fiber with the phase velocity of the optical wave $f_1$. Since the optical fiber 12 is designed to support a mode for the optical wave $f_3$, a mixing of two waves each of the frequency $f_1$ produces a sum signal or wave at a frequency of $2f_1$ or $f_3$ whose amplitude builds up along the optical fiber as long as the requirements for momentum balance within the optical fiber 12 exist. In order to maintain the momentum balance within an optical fiber, which is a dispersive medium, the propagation constants of the two mixing waves and of the sum signal or wave must be such that $k_1+k_2=k_3$, where $k_1$, $k_2$ and $k_3$ are the propagation constants of optical waves $f_1$, $f_2$ and $f_3$, respectively. This condition is the requirement that a wave generated at a first point is in phase with a wave of the same frequency being generated at a subsequent point when the wave generated at the first point reaches the second point. If this condition is not satisfied nonlinear interaction will take place, but will be ineffective, since the signals generated along different portions of the path of the desired output signal will interfere destructively. In the production of a second harmonic, the mixing waves are $f_1$ and $f_2$ where $f_2$ equals $f_1$ and, therefore, the relationship of the propagation constants in the optical fiber 12 may simply be expressed as $2k_1=k_3$. As is known, the propagation constant $k$ of an optical wave is equal to $$\hat{k}\frac{\omega}{v}$$

where $\hat{k}$ is a unit vector in the direction of propagation, $\omega$ is $2\pi f$, $f$ being the frequency of the propagating wave and $v$ the phase velocity. In unbounded materials the phase velocity is equal to $c/n$, $c$ being the velocity of light in vacuum or air and $n$ being the index of refraction of the medium at the frequency of the propagating wave. Accordingly, it can be seen that by a proper choice of the conditions of propagation for each of the optical waves $f_1$ and $f_3$ the phase velocities may be made equal and a conversion of the energy from the optical wave $f_1$ to the optical wave $f_3$ is produced throughout the length of the optical fiber 12.

For a detailed explanation regarding the creation of desired modes for producing the required phase velocity for the waves $f_1$ and $f_3$, reference may be had to articles entitled "Cylindrical Dielectric Waveguide Modes" and "Observed Dielectric Waveguide Modes in the Visible Spectrum" by E. Snitzer and E. Snitzer et al., respectively, in the Journal of the Optical Society of America, vol. 51, No. 5, May 1961, pages 491–505. As described in these articles a desired phase velocity is produced by a proper choice of the indices of refraction of the core 20 and of the cladding 22 of the optical fiber 12, and the radius $R_c$ of the core. It is possible to select individual modes, of many which are allowed, by adjustment of the angle $\theta$ at which the optical energy is introduced into the optical fiber 12, as indicated in FIGS. 1 and 2.

FIG. 2 shows an optical system utilizing elements similar to those shown in FIG. 1 of the drawing but which includes, instead of the single optical source 10, first and second optical sources 24 and 26, each being intense radiation generators, applying radiation energy to the one end of the optical fiber 12 through first and second focusing lenses 28 and 30, respectively.

The system illustrated in FIG. 2 may operate so as to produce an optical wave which has a frequency equal to the sum or difference of two optical waves applied to an end of the optical fiber 12. The first and second optical sources 24 and 26 apply to an end of the optical fiber 12 optical waves of frequency $f_1$ and $f_2$ which differ from each other. By a proper design of the optical fiber 12, as described in the above identified articles in the Journal of the Optical Society of America, the optical waves $f_1$ and $f_2$ propagate through the optical fiber 12 and are mixed therein so as to produce a strong optical wave $f_3$ at the other end of the optical fiber 12 which has a sum frequency equal to $f_1+f_2$ or a difference frequency equal to $f_1-f_2$. The relationship of the propagating constants of the waves in the optical fiber 12 must be either $k_3=k_1+k_2$ or $k_3=k_1-k_2$ depending upon whether the sum frequency or difference frequency, respectively, is desired. Accordingly, it can be seen that the system illustrated in FIG. 2 may be referred to as a parametric up converter when the sum frequency is obtained and a parametric down converter when the difference frequency is obtained.

It should also be understood that the system illustrated in FIG. 2 may be used as an optical traveling wave parametric amplifier. In the operation of the system shown in FIG. 2 as a traveling wave amplifier, the first optical source 24 may be a source of intense coherent optical radiation $f_3$ and the second optical source 26 may be a source producing a weak signal $f_1$ which is to be amplified. The frequency relationship of the optical waves of interest in the optical fiber 12 is $f_3-f_1=f_2$, where $f_3$ may be regarded as the pump wave, $f_1$ as the signal wave and $f_2$ as the idler wave. If the pump wave $f_3$ has a frequency twice that of the signal wave $f_1$, the frequency relationship $$f_3-f_1=f_1=\frac{f_3}{2}$$

exists in the optical fiber 12, and the momentum condition is satisfied if the waves $f_1$ and $f_3$ have equal phase velocities in the fiber 12. Thus, the energy from the first optical source 24 producing the pump wave is transferred into the signal wave $f_1$ as the two waves travel at equal phase velocities through the optical fiber 12 to produce at the output end of optical fiber 12 an amplified signal wave $f_1$.

For a better understanding of the operation of this invention, it should be noted that in a non-linear dielectric medium the dielectric constant $\epsilon$ is a function of applied electric field E. When this constant is small it may be approximated by its weak field value $\epsilon_0$ with a correction term $$E\frac{d\epsilon}{dE}$$

Accordingly, the effective dielectric constant governing the propagation of waves through the dielectric medium is taken as $$\epsilon(E)=\epsilon_0+E\frac{d\epsilon}{dE}$$

As an illustration of the effect of this field dependent term the perturbation due to it on an electromagnetic wave propagating in time in an unbounded medium along the direction taken as $x$ must be considered. Thus, for non-magnetic dielectrics, $$\frac{\partial^2 E}{\partial x^2}-\frac{\epsilon_0}{c^2}\frac{\partial^2 E}{\partial t^2}=\frac{1}{2c^2}\frac{\partial\epsilon}{\partial E}\frac{\partial^2 E^2}{\partial t^2} \quad (1)$$

The applied electric field E produced by the two mixing signals, say $f_1$ and $f_2$, in a non-linear dielectric medium is the total instantaneous electric field $$E=E_1 \sin(\omega_1 t-k_1 x)+E_2 \sin(\omega_2 t-k_2 x) \quad (2)$$

When substituting the value of E as given in Equation 2 into the right hand side of Equation 1 it can be shown that there is a wave $E_3$ growing linearly with time $t$ such that $$E_3=\alpha t \cos(\omega_3 t-k_3 x+\phi)$$

$\alpha$ being an arbitrary phase factor. The frequency $f_3$ of the growing wave is either the sum or difference of the frequencies $f_1$ and $f_2$ and $k_3$ is the propagation constant for this sum or difference wave such that it is equal to the sum or difference of $k_1$ and $k_2$. The constant $\alpha$ is derived from parameters as $$\alpha=\frac{\omega_3 E_1 E_2}{4}\frac{1}{\epsilon}\frac{d\epsilon}{dE}$$

and expresses the growth rate of wave $E_3$.

The amplitude of $E_3$ at time T is thus $$E_3=ET=\frac{\omega_3 T}{4}E_1E_2\frac{1}{\epsilon}\frac{d\epsilon}{dE}$$

During this time the wave $E_3$ has traveled the distance L or N wavelengths. As indicated hereinabove the growing wave $E_3$ requires that the signal $E_3$ generated by the non-linear interaction in different portions of space interferes constructively for a significant number of wavelengths while the waves interact. If N is the number of wavelengths during which the interaction of waves $E_1$ and $E_2$ gives a maximum $E_3$, then this $E_3$ will be given by $$E_3=\frac{2\pi}{4}E_2E_1\frac{1}{\epsilon}\frac{d\epsilon}{dE}N$$

The above derivation is illustrative of a general parametric frequency conversion. Its action is well known in the microwave region to lead to amplification particularly when the amplified signal is at a lower frequency than the intense pumping frequency producing the non-linearity. This action is also true in the optical region in the initial build-up of the signal being amplified as given by the rate $$\alpha=\frac{\beta\omega}{4}$$

where $\omega$ is $2\pi$ times the frequency being amplified and $\beta$ is the percentage change in the dielectric constant as a pump field varies from zero to its maximum. It should be understood that the value of $\alpha$ should exceed the losses in the parametric systems of the present invention. In a transit time T, $$\alpha T=\left(\frac{2\pi}{4}\right)N\beta$$

where N is the number of subharmonic cycles. Many optical elements, for example, crystals with a lack of inversion symmetry which include piezoelectric and ferroelectric crystals, have absorption constants which are small enough to permit gain to be realized in the system of the present invention.

Although $$E\frac{d\epsilon}{dE}$$

is maximized for intense optical electric fields, such as those produced by lasers, this is not a necessary requirement, nor is it necessary that the optical radiations have the frequency monochromaticity characteristic of lasers.

Since optical media are generally dispersive the propagation constants of all the waves of interest passing through the non-linear dielectric medium must be considered. As stated hereinabove the frequency relationship between the waves traveling through the non-linear dielectric medium must be $f_1 \pm f_2 = f_3$ and the vectorial relationship of the propagation constants must be $$\vec{k}_1 \pm \vec{k}_2 = \vec{k}_3$$

In the harmonic generation or frequency converter process of the system of the present invent the left hand side of the last two equations represents the input to the non-linear dielectric medium. In the parametric amplification process the right hand side of the last two equations represents the pumping wave applied to the non-linear dielectric medium. In a nondispersive medium the first of the latter two relationships and collinearity in the optical medium imply the second of these relationships, but in the dispersive case, the frequency relationship remains unimpaired but the second requirement which insures that the waves being generated at different parts of space add constructively requires further consideration. If the waves are not collinear then the momenta of the waves must be represented in vectorial form wherein the vector sum or difference of $\vec{k}_1$ and $\vec{k}_2$ is equal to $\vec{k}_3$. This matching condition occurs when $f_1$ and $f_2$ are within a frequency range determined by the dispersion of the material. It can be seen that in this condition the absolute value of $k_3$ is less than the absolute value of $k_1$ plus $k_2$ and is less than the maximum possible momentum obtainable in the collinear case. Accordingly, $k_3/f_3$ is less than either $k_1/f_1$ or $k_2/f_2$. The ratio $k/f$ is the reciprocal of the phase velocity divided by $2\pi$. Hence the phase velocity at the high frequency $f_3$ must be higher than at the lower frequencies $f_1$ or $f_2$. By utilizing a dielectric medium which has anomalous dispersion region intervening between $f_1$ and $f_2$ this condition is readily satisfied. The required velocity relationship is obtained when both $f_1$ and $f_3$ are in the high frequency tail of a dielectric relaxation or overdamped resonance.

In the case of the parametric amplifier, if $f_1$ is the signal frequency at the input end of the optical fiber 12 then $f_3-f_1=f_2$ defines the idler frequency as stated hereinabove. If the optical wave having the frequency $f_1$ is made to propagate in the correct direction relative to the optical wave having the frequency $f_3$ so as to satisfy the vectorial relationship set forth hereinabove, then the idler wave of frequency $f_2$ is automatically generated with the proper direction of propagation.

The momentum conservation need not be exactly satisfied in order to produce the desired parametric effects. As long as the contributions to the waves being generated are in phase over a region in which the wave grows appreciably, an effective non-linear interaction is produced, determining the bandpass for the parametric conversion.

It should be understood that the optical fibers used in the system of the present invention should contain a non-linear polarization medium, preferably a non-linear dielectric in the form of a single crystal whose crystalline axes are suitably oriented with respect to the longitudinal direction of the fiber.

When an optical fiber is used, as is shown in FIGS. 1 and 2 of the drawing, the fiber must also satisfy the above set forth frequency and propagation velocity requirements. The latter, however, depend not only on the indices of refraction for the core and cladding but upon the type of mode chosen for the propagation and upon the geometry of the fiber. For these guided modes of the optical fiber the relation for the propagation constants becomes specifically $$\frac{1}{\lambda_{g1}}\pm\frac{1}{\lambda_{g2}}=\frac{1}{\lambda_{g3}}$$

where $1/\lambda_{g1}$, $1/\lambda_{g2}$ and $1/\lambda_{g3}$ are the reciprocals of the guide wavelength at frequencies $f_1$, $f_2$ and $f_3$, respectively. These guide wavelengths are described in the above mentioned Journal of the Optical Society of America article. Thus, it can be seen that when the first and second optical sources 24 and 26 apply optical waves having frequencies $f_1$ and $f_2$, respectively, to the optical fiber 12 a sum frequency or a difference frequency $f_3$ may be derived at the output end of the optical fiber 12 depending upon the design and materials of the optical fiber 12.

FIG. 3 illustrates an embodiment of the present invention for producing microwaves from optical waves. This system may be referred to as a parametric frequency down converter. As shown in FIG. 3 this system includes a first optical source 32, preferably a source providing coherent radiation with an intense electric field, for applying energy into a waveguide 34 which may have a given transverse rectangular cross-sectional area at a first portion 36 thereof and a transverse rectangular cross-sectional area at a second portion 38 thereof, which may be a standard microwave guide, greater than the given cross-vectorial area of the first portion 36 and a flared or third portion 40 interconnecting the first and second portions. An optical fiber 42 of the type described hereinabove in connection with FIGS. 1 and 2 is centrally disposed within the first portion 36 of the waveguide 34 along the longitudinal direction thereof. The optical fiber 42 is provided with a suitable absorber 44 of optical radiation at one end thereof remote from the first optical source 32. A dielectric material 46 surrounds the optical fiber 42 and extends into the flared portion 40 of the waveguide 44 forming an opening in the third portion 40 in the form of a truncated pyramid with the absorber 44 near the apex thereof and with the base thereof at the second portion 38 of the waveguide 34. The optical radiation from the first optical source 32 is focused onto the end of the optical fiber 42 opposite that at which the absorber is located through a first focusing lens 48. The system shown in FIG. 3 also includes a second optical source 50 producing preferably optical coherent radiation of a frequency slightly different from that of the first optical source. The radiations from the second optical source 50 are also applied to the end of the optical fiber 42 opposite the end at which absorber 44 is disposed through a second focusing lens 52 and by reflection from a half silvered mirror 54 disposed in the path of the radiations from the first optical source 32.

To produce microwaves in the system illustrated in FIG. 3 of the drawing the frequency relationship of the waves therein is $f_2-f_1=f_3$, where $f_1$ and $f_2$ indicate frequencies of optical waves produced by the first and second optical sources, respectively, and where $f_3$ is much less than $f_2$ or $f_1$. The first optical source 32 may be a ruby laser of the type described in an article entitled "Stimulated Optical Radiation in Ruby," Nature, vol. 187, August 1960, page 493, which produces an output frequency in the red portion of the electromagnetic wave spectrum, for example, at 6943 angstroms, and the second optical source 50 may be a laser of the same type thermally or otherwise detuned from the first source 32. The embodiment is, however, applicable to any two optical systems for which the frequency differences are in the microwave range. It should be noted that if one laser is frequency modulated with respect to the first, the appearance of microwave energy in this device serves to detect this modulation. Thus, it can be seen that the optical wave $f_2$ is very nearly equal in frequency to the optical wave $f_1$ and since the non-linear dielectric medium is in the form of an optical fiber the reciprocals $1/\lambda_{g1}$ and $1/\lambda_{g2}$ of the guide wavelengths of waves $f_1$ and $f_2$, respectively, are approximately equal. Accordingly, the reciprocal of the guide wavelength of the microwave produced as a result of the interaction of the optical waves should be $$\frac{1}{\lambda_{g3}}=\frac{1}{\lambda_{g2}}-\frac{1}{\lambda_{g1}}$$

where $\lambda_{g3}$ has a value very much greater than either optical wavelength. A structure which propagates the guide wavelength of the microwave $f_3$ is provided by employing a suitable dielectric material 46 to adjust the guide wavelength in the waveguide 34 and also by adjustment of the larger dimension of the rectangular area of the first portion 36 of the waveguide 34. 34

In the operation of the system shown in FIG. 3 the optical radiations from the first and second optical sources 32 and 50 are introduced into the non-linear dielectric medium of the optical fiber 42 so as to interact therein to produce a wave having a frequency equal to the difference frequency between the two optical radiations. 42 When this difference frequency falls within the microwave region of the electromagnetic wave spectrum a microwave is, of course, produced. The optical energy which is not converted into a microwave radiation in the first region 36 of the waveguide 34 is absorbed in the absorber 44. The microwave energy produced in the first portion 36 of waveguide 34 is coupled from the first portion 36 of the waveguide 34 to the second portion or standard waveguide section 38 through the third or transition portion 40 of the waveguide 34 which is designed to produce minimum reflections and distortions of the microwaves.

FIG. 4 illustrates a modification of the microwave producing system shown in FIG. 3 of the drawing. The system shown in FIG. 4 employs the first and second optical sources 32 and 50, the first and second focusing lenses 48 and 52, the half silvered mirror 54 and the optical fiber 42 embedded in the dielectric material 46 in the same manner as described hereinabove in connection with the system illustrated in FIG. 3 of the drawing. However, in the system of FIG. 4 the optical fiber 42 which is surrounded by the dielectric material 46 is disposed in a microwave cavity 56 tuned to the desired microwave frequency to produce standing waves therein. First and second optical reflectors 58 and 60 are disposed at opposite ends of the optical fiber 42 so as to form an interferometer arrangement of the Fabry-Perot type. This arrangement intensifies the optical waves in fiber 42 and enhances the microwave conversion efficiency. The cavity 56 has a first aperture 62 through which the optical radiations from the first and second optical sources 32 and 50 are applied to one end of the optical fiber 42 and a second aperture 64 forming an iris through which energy from the cavity may be coupled into a standard microwave guide 66. The length of the optical fiber 42 is such that the fiber is tuned at frequencies $f_1$ and $f_2$ so as to act as an interferometer to intensify the waves therein. The relationship of the reciprocals of the waveguides $$\frac{1}{\lambda_{g3}}=\frac{1}{\lambda_{g2}}-\frac{1}{\lambda_{g1}}$$

set forth hereinabove in connection with the description of the system of FIG. 3 must also be satisfied. The length of the cavity $L_c$ is equal to $m(\lambda_{g3})/2$, where $m$ is any integer.

The operation of the system illustrated in FIG. 4 of the drawing is somewhat similar to that of the system shown in FIG. 3. The basic difference between these two systems is that in the system of FIG. 4 the microwave generated by the applied optical waves is enhanced in the cavity 56 and the optical waves $f_1$ and $f_2$ are intensified by the optical cavity formed in the fiber 42 by reflectors 58 and 60. A portion of this microwave energy is coupled into the standard or conventional waveguide 66 through the iris 64 to any suitable utilizing device.

Although each of the systems of the present invention illustrated hereinafter have included a non-linear dielectric optical fiber therein it should be understood that the invention is not limited to the use of such fibers. In FIG. 5 of the drawing there is shown a system for producing a second harmonic or first overtone $f_3$ of a fundamental wave $f_1$ which includes a resonant structure 68 having a pair of parallel plates 70 and 72 of the Fabry-Perot type between which there is disposed a non-linear dielectric medium 74. An optical source 76, preferably a coherent radiation source for producing the fundamental wave having the frequency $f_1$, is disposed so as to apply radiations therefrom perpendicularly to the plane of the plate 70 into the dielectric medium 74. Each of the pair of plates 70 and 72 are designed so as to be highly reflective, reflectivities of 99.5% being obtainable wtih tuned dielectric coatings, at the frequency $f_1$ of the fundamental wave. The plate 72 is designed to pass waves of a frequency $2f_1$ or $f_3$ which are intercepted by a suitable detector 78. The non-linear crystalline axis of the dielectric medium 74 is arranged so as to maximize the rate of change of the dielectric constant of the medium 74 with respect to the electric field intensity produced by the electromagnetic radiations within the medium 74. The structure including the plates 70 and 72 and the medium 74 is made resonant to the frequency $f_1$ of the radiations from the optical source 76 so that L, the length between the pair of plates 70 and 72, is equal to $m\lambda_1/2$, where $m$ is any integer and $\lambda_1$ is the wavelength of the wave $f_1$. The structure 68 including plates 70 and 72 and the medium 74 need not be resonant to the second harmonic or a first overtone $f_3$ of the fundamental $f_1$.

In order to produce the second harmonic $f_3$ of the fundamental wave $f_1$ in the system shown in FIG. 5, the phase velocity of the fundamental wave $f_1$ and of the second harmonic $f_3$ must be at least approximately equal as explained hereinabove in connection with the system shown in FIG. 1 of the drawing. Accordingly, $$v=f_1\lambda_1=f_3\lambda_3$$

Since $v$ must be also equal to $c/n$, where $n$ is the index of refraction of the non-linear dielectric medium 74, $n$ must have at least approximately the same value for the fundamental wave of the frequency $f_1$ and for the second harmonic of the frequency $f_3$. Hence, the nonlinear dielectric material for the frequencies $f_1$ and $f_3$ must be carefully chosen in order to satisfy these velocity requirements. Since the typical variation of the index of refraction in a nonlinear dielectric medium when plotted against the frequency of the electromagnetic radiations traveling therethrough is that indicated by the graph shown in FIG. 6 of the drawing, it can be readily seen that optical waves having frequencies $f_1$ and $f_3$ can be chosen so as to have the same value of $n$. Of course, if the nonlinear dielectric medium 74 were non-dispersive the index of refraction $n$ for all optical frequencies would be the same and the fundamental wave could be chosen from a wider range of frequencies.

By providing the resonant structure 68 in the system of FIG. 5 of the drawing, the electric field $E_1$ of the fundamental wave $f_1$ is considerably intensified within the medium 74 over that which would be produced therein if the plates 70 and 72 were not provided. However, it should be understood that the system of FIG. 5 is operable without the plates 70 and 72 by providing an optical source 76 which produces optical waves having highly intense electric fields.

FIG. 7 illustrates a modification of the embodiment of the present invention shown in FIG. 5 wherein two optical waves are mixed to produce a third wave which may have a frequency equal to either the sum or difference of the two optical waves. In FIG. 7 there is shown a system which includes a resonant structure 80 having a pair of parallel plates 82 and 84 of the Fabry-Perot type between which there is disposed a nonlinear dielectric medium 86. A first optical source 88, preferably a coherent radiation source, is disposed so as to apply radiations therefrom to the nonlinear dielectric medium 86 through the plate 82. A second optical source 90, which may be either a source of coherent radiation or of incoherent radiation, is also disposed so as to apply radiations therefrom to the nonlinear dielectric medium 86 through the plate 82. A suitable detector 92 is provided for receiving radiations from the medium 86 passing through the plate 84.

It has been emphasized in the preceding discussion that the optical parametric conversion disclosed herein, and which permits efficient optical energy conversion due to the interaction of the contributing waves over large distances, depends upon frequency and momentum balance conditions. For the general situation of FIG. 7 the frequency relation is still $f_1 \pm f_2 = f_3$, where $f_1$ and $f_2$ are the frequencies of sources 88 and 90, respectively, and $f_3$ is the converted frequency detected by detector 92.

The momentum condition that must be satisfied by the propagation vectors is $$\vec{k}_1 \pm \vec{k}_2 = \vec{k}_3$$

with these $\vec{k}$'s depending upon the direction of propagation of the respective rays, and this is emphasized by the use of the arrow over the $k$'s, a standard vectorial designation. Each $\vec{k}$ has a magnitude $$\frac{2\pi f}{v}=\frac{2\pi f n}{c}=\frac{2\pi}{\lambda}$$

with $f$ the frequency, $c$ the velocity of light in free space, $v$ the phase velocity of light in the crystal at frequency $f$ and for a given direction of propagation in the crystal, $\lambda$ the wavelength of that light in the crystal, and $n$ the effective index of refraction. The direction of propagation of the wave is specified by the unit vector $\hat{k}$, so $$\vec{k}=\frac{2\pi f}{v}\hat{k}=\frac{2\pi f n}{c}\hat{k}=\frac{2\pi}{\lambda}\hat{k}$$

For a given crystal $$n=\frac{c}{v}$$

but its value depends both on the frequency of the wave and the direction of light propagation with respect to the crystalline axes of the nonlinear material.

Referring again specifically to FIG. 7, the frequencies and directions of the respective waves are matched with respect to the crystalline properties so that the momentum condition is satisfied, and this relationship is indicated in standard vector notation in FIG. 7*a* of the drawing.

It is known in the optical art that optical crystals, as quartz, potassium di-hydrogen phosphate, tri-glycine sulfate, and others, are nonlinear and have indices of refraction $n$ which depend upon frequency $f$ and propagation direction $\hat{k}$ for each optical wave. Thus parametric frequency conversion or amplification is provided by the choice of angles and frequencies such that $$n_1f_1+n_2f_2 \cos \theta_2=n_3f_3 \cos \theta_3$$

and $$n_2f_2 \sin \theta_2=n_3f_3 \sin \theta_3$$

Solving these equations by standard algebraic methods, and using physical data for the properties of the crystals as determining the $n$'s, yields the geometry required for the system shown in FIG. 7.

Accordingly, by suitably directing the radiations from the optical source 90 at an angle $\theta_2$ with respect to the beam of source 88, the wave $f_3$ produced as a result of the interaction of the waves $f_1$ and $f_2$ passes through the nonlinear dielectric medium 86 in a direction indicated by $\theta_3$ with respect to the beam of source 88 such that the index of refraction of the medium 86 along this direction for wave $f_3$ has a value $n_3$.

The plate 82 is designed so that it is reflective to approximately 95% to 99% of the waves incident thereon of the frequency $f_1$ and transparent for waves having a frequency $f_2$ and the plate 84 is designed so as to be highly reflective for waves having a frequency $f_1$ and transparent for waves having a frequency $f_3$. As stated hereinabove in connection with the system illustrated in FIG. 5 of the drawing, it should be understood that the parallel plates 82 and 84 need not be utilized in the system of FIG. 7 for the successful operation thereof provided radiations applied to the nonlinear dielectric medium 86 have a highly intense electric field.

In the operation of the system illustrated in FIG. 7 the first and second optical sources 88 and 90 may each be of a type which produces intense coherent radiations which when applied to the non-linear dielectric medium 86 are beat therein to produce a sum or difference frequency $f_3$ as desired. Alternatively, the first optical source 88 may be of a type which produces intense coherent radiations and the second optical source 90 may represent a weak signal source having a frequency equal to approximately one-half the frequency of the radiations produced by the first optical source 88. Under these conditions the system illustrated in FIG. 7 may operate as a parametric amplifier which amplifies the weak signals from the second optical source 90 by a conversion of energy within the non-linear dielectric medium 86 from the first optical source 88 to the radiations from the second optical source 90. The frequency of the output signal from this parametric amplifier detected by detector 92 is, of course, equal to the frequency of the signal produced by the second optical source 90 and the detector 92 is then positioned so as to detect the beam at angle $\theta_2$. It should also be understood that the system of FIG. 7 is also capable of producing the sum or difference frequency of the frequencies $f_1$ and $f_2$ from the first and second optical sources 88 and 90 when the first optical source 88 produces an intense coherent radiation and the second optical source 90 produces a weak incoherent wave $f_2$.

Accordingly, it can be seen that the present invention has provided improved systems for converting optical energy from a given wave into optical energy of another wave. These systems provide means for converting optical energy of a given frequency into optical energy of a frequency either higher or lower than that of the given frequency. In accordance with the teachings of this invention optical signals are modulated or demodulated and weak optical signals are amplified into signals of higher intensity.

While the invention has been particularly shown and described with reference to preferred embodiments thereof, it will be understood by those skilled in the art that various changes in form and details may be made therein without departing from the spirit and scope of the invention.

What is claimed is:

1. A traveling wave parametric system comprising (a) an optical fiber having a core member and a cladding member, at least one of said members being made of a non-linear dielectric material, (b) means for applying a first optical wave of a given frequency to said optical fiber, said fiber being capable of supporting said first optical wave of given frequency and a second optical wave of twice said given frequency, said first optical wave being applied to said fiber to produce said second wave of twice said given frequency therein and in a direction such that said first and second waves travel through said fiber at equal phase velocities, and (c) means for detecting said second optical wave.

2. A traveling wave parametric system comprising (a) an optical fiber having a core member and a cladding member, at least one of said members being made of a non-linear dielectric medium, (b) means for applying a first optical wave of a first given frequency to said fiber, (c) means for applying a second optical wave of a second given frequency to said optical fiber, said optical fiber being capable of propagating said first and second optical waves in selected modes along its axis and a third optical wave of a frequency equal to the algebraic sum of said first and second given frequencies which propagates along the axis of the fiber in a mode such that its propagation constant is the corresponding vectorial sum of the propagation constants of said first and second waves, said first and second waves being applied to said fiber to produce said third wave therein and to propagate through said fiber with said third wave, and (d) means for detecting said third optical wave.

3. A traveling wave parametric system as set forth in claim 1 wherein said first optical wave applying means includes means for focusing said first optical wave on one end of said optical fiber.

4. A traveling wave parametric system as set forth in claim 2 wherein (a) each of said first and second optical wave applying means includes means for focusing said first and second optical waves, respectively, at one end of said optical fiber and wherein (b) said means for detecting said third optical wave is disposed at the other end of said optical fiber.

5. A parametric amplifier comprising (a) an optical fiber having a core member and a cladding member, at least one of said members being made of a non-linear dielectric material, (b) means for applying a first optical wave of a first given frequency to one end of said fiber, (c) means for applying a second optical wave of a second given frequency to the one end of said optical fiber, said fiber being capable of propagating said first and second optical waves in selected modes along its axis and a third wave of a frequency equal to the difference of said first and second given frequencies which propagates along the axis of said fiber in a mode such that its propagation constant is the difference of the propagation constants of said first and second waves, said first and second waves being applied to said fiber to produce said third wave therein and to propagate through said fiber with said third wave, and (d) means for detecting one of said second and third optical waves emanating from an end of said optical fiber.

6. A parametric amplifier as set forth in claim 5 wherein the frequency of said third optical wave is equal to the frequency of said second optical wave.

7. A parametric amplifier as set forth in claim 6 wherein the intensity of said first optical wave at the one end of said fiber is substantially higher than the intensity of said second optical wave at the one end of said fiber.

8. A traveling wave parametric system comprising (a) a microwave waveguide having a first dielectric medium therein of a given index of refraction, (b) an optical fiber having a core member and a cladding member embedded within said first dielectric medium, at least one of said members being made of a non-linear dielectric medium, (c) means for applying a first optical wave of a first given frequency to one end of said fiber, (d) means for applying a second optical wave of a second given frequency to the one end of said fiber, said optical fiber being capable of propagating said first and second optical waves in selected modes along its axis and the value of the given index of refraction of said first dielectric material being such that a third wave having a frequency equal to the difference of said first and second given frequencies falling within the microwave region of the electromagnetic wave spectrum generated in the non-linear dielectric medium travels through said waveguide with a propagation constant that is equal to the difference between the propagation constants of the first and second optical waves, and (e) means for detecting said third wave.

9. A traveling wave parametric system as set forth in claim 8 wherein (a) said waveguide is in the form of a resonant cavity at the frequency of said third wave and further including (b) a pair of optical wave reflecting plates disposed at opposite ends of said fiber to form a structure resonant at one of said first and second optical waves.

10. A traveling wave parametric system as set forth in claim 8 wherein said core member is made of a non-linear dielectric medium.

11. A traveling wave parametric system as set forth in claim 1 wherein said core member is made of a non-linear dielectric material.

References Cited by the Examiner

UNITED STATES PATENTS

| | | | |
|---|---|---|---|
| 1,981,999 | 11/1934 | French | 88—1 |
| 2,929,922 | 3/1960 | Schawlow et al. | 250—199 |
| 3,045,188 | 7/1962 | Howell et al. | 332—52 |
| 3,091,698 | 5/1963 | McNaney | 88—1 |
| 3,096,485 | 7/1963 | Chang | 330—4.6 |
| 3,132,258 | 5/1964 | Gaertner et al. | 250—199 X |
| 3,133,198 | 5/1964 | Kaminow et al. | 250—199 |
| 3,157,726 | 11/1964 | Hicks et al. | 88—1 |
| 3,234,475 | 2/1966 | Giordmaine et al. | 250—199 X |
| 3,239,670 | 3/1966 | Bloembergen | 250—199 |

OTHER REFERENCES

Snitzer: Journal of Applied Physics, vol. 32, No. 1, January 1961, pp. 36–39.

Snitzer et al.: J. Opt. Soc. Am., vol. 51, No. 5, May 1961, pp. 499–505.

DAVID G. REDINBAUGH, *Primary Examiner.*

JOHN W. CALDWELL, *Examiner.*